(12) United States Patent
Schulze et al.

(10) Patent No.: US 11,442,862 B2
(45) Date of Patent: Sep. 13, 2022

(54) FAIR PREFETCHING IN HYBRID COLUMN STORES

(71) Applicant: SAP SE, Walldorf (DE)

(72) Inventors: Robert Schulze, Walldorf (DE); Adrian Dragusanu, North Vancouver (CA); Anup Ghatage, Dublin, CA (US); Colin Florendo, Marlborough, MA (US); Mihnea Andrei, Issy-les-Moulineaux (FR); Randall Hammon, Walnut Creek, CA (US); Sarika Iyer, San Ramon, CA (US); Simhachala Sasikanth Gottapu, Dublin, CA (US); Yanhong Wang, Dublin, CA (US)

(73) Assignee: SAP SE, Walldorf (DE)

(*) Notice: Subject to any disclaimer, the term of this patent is extended or adjusted under 35 U.S.C. 154(b) by 288 days.

(21) Appl. No.: 16/850,310

(22) Filed: Apr. 16, 2020

(65) Prior Publication Data

US 2021/0326263 A1  Oct. 21, 2021

(51) Int. Cl.
| | | |
|---|---|---|
| *G06F 12/08* | (2016.01) | |
| *G06F 12/0862* | (2016.01) | |
| *G06F 12/0882* | (2016.01) | |
| *G06F 16/24* | (2019.01) | |
| *G06F 16/22* | (2019.01) | |

(52) U.S. Cl.
CPC ...... *G06F 12/0862* (2013.01); *G06F 12/0882* (2013.01); *G06F 16/221* (2019.01); *G06F 16/2282* (2019.01); *G06F 16/24* (2019.01)

(58) Field of Classification Search
CPC .. G06F 12/0862; G06F 12/0882; G06F 12/00; G06F 16/221; G06F 16/2282; G06F 16/24; G06F 13/00
See application file for complete search history.

(56) References Cited

U.S. PATENT DOCUMENTS

| | | | | |
|---|---|---|---|---|
| 2002/0116579 | A1* | 8/2002 | Goodhue | G06F 9/3814 |
| | | | | 712/E9.058 |
| 2004/0059721 | A1* | 3/2004 | Patzer | G16B 50/00 |
| 2006/0136228 | A1* | 6/2006 | Lin | G10H 7/006 |
| | | | | 704/278 |
| 2016/0371331 | A1* | 12/2016 | Pagh | G06F 16/215 |
| 2018/0275919 | A1* | 9/2018 | Chirumamilla | G06F 3/0656 |

* cited by examiner

*Primary Examiner* — Tuan V Thai
(74) *Attorney, Agent, or Firm* — Sterne, Kessler, Goldstein & Fox P.L.L.C.

(57) ABSTRACT

Disclosed herein are system, method, and computer program product embodiments for performing fair prefetching. An embodiment operates by splitting a data vector into a first subrange and a second subrange. The embodiment performs a first chance prefetch operation on the first subrange based on a fixed number of pages, thereby loading a set of pages of the first subrange into a main memory. The embodiment performs the first chance prefetch operation on the second subrange based on the fixed number of pages, thereby loading a first set of pages of the second subrange into the main memory. The embodiment performs a second chance prefetch operation on the second subrange based on the performing the first chance prefetch operation on the second subrange, thereby loading a second set of pages of the second subrange into the main memory. The embodiment then executes the query.

20 Claims, 5 Drawing Sheets

FAIR PREFETCHING IN HYBRID COLUMN STORES

BACKGROUND

Background

An in-memory database management system (DBMS) is designed to hold most of its data in main memory. But it is often impossible for the DBMS to keep most of its data in main memory. This is often the case when performing a column scan during query execution. The DBMS is often unable to load the entire column into main memory. To reduce such memory pressure, the DBMS can split the column into subranges and load each subrange page-wise. But each page load can block the column scan. To reduce such input/output (I/O) latencies, the DBMS can prefetch pages that are expected to be needed soon. But such prefetching is often unfair. This is because the DBMS may not prefetch approximately the same number of pages for each subrange of the column. The DBMS may also not prefetch pages in the same order that they are visited during the column scan. Such unfair prefetching can create unpredictable query response times and reduce the amount of queries capable of being processed.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for performing fair prefetching in a hybrid column store database in response to a query. An embodiment operates by partitioning a column of a database table into subranges. The embodiment performs a first chance prefetch operation on each subrange. The first chance prefetch operation can prefetch a fixed number of pages for each subrange. The embodiment repeats the first chance prefetch operation on each subrange until all rows of the respective subrange have been prefetched or a prefetch limit is reached. The embodiment then performs a second chance prefetch operation on each subrange having pages that were not prefetched in the first chance prefetch operation.

The embodiment can solve at least two technological problems. First, the embodiment can provide fair prefetching for a query. This is because the first chance prefetch operation can prefetch approximately the same number of pages for each subrange of the column. Moreover, this is because the first chance prefetch operation can prefetch pages in the same order that they are visited during the column scan. The embodiment's fair prefetching can provide more predictable query response times and increase the amount of queries capable of being processed.

Second, the embodiment can increase the utilization of prefetch pages during query execution. This is because the second chance prefetch operation can ensure that as many pages as possible are prefetched for a query. This can improve the chance that the query can be serviced by the prefetched pages.

Figure 1:
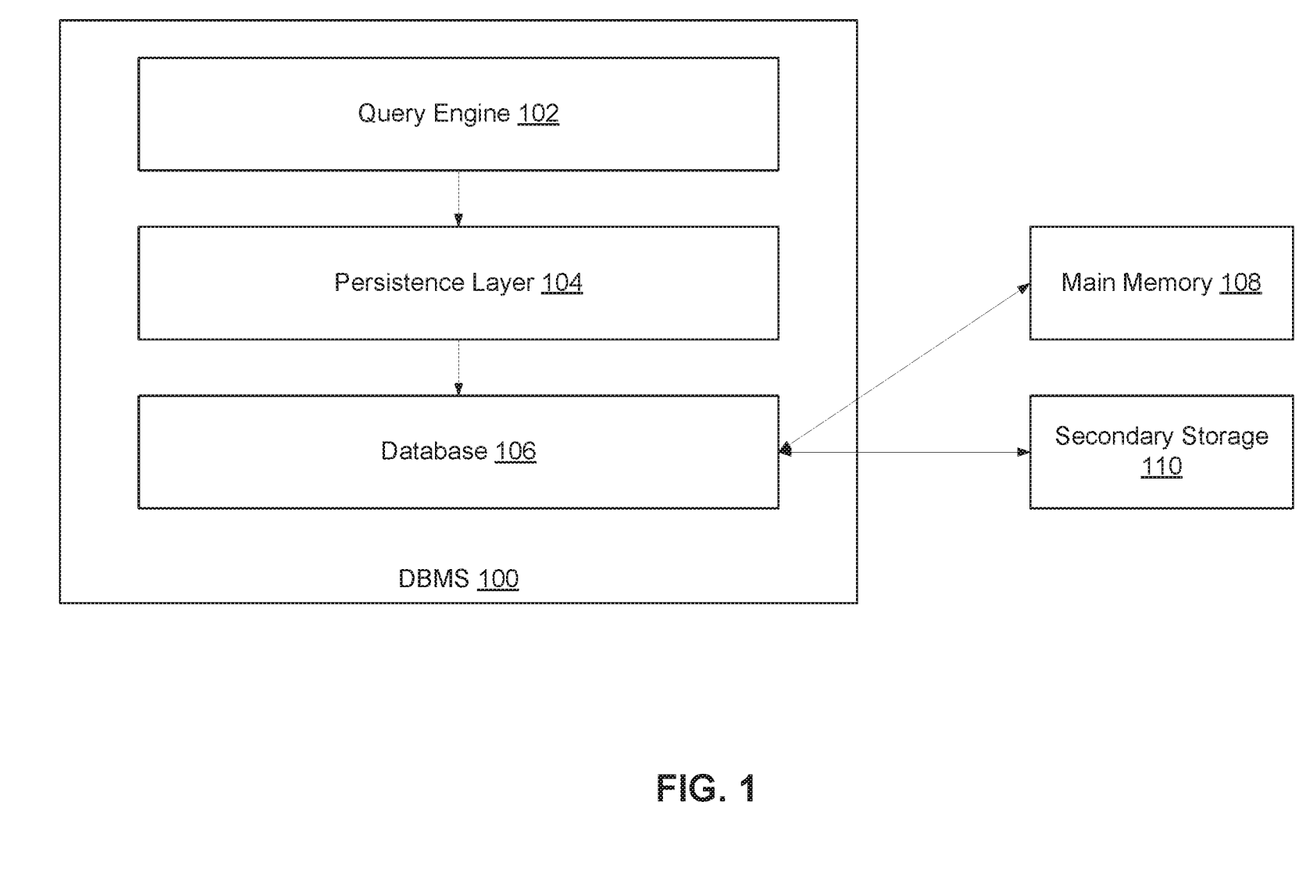
FIG. 1 illustrates an in-memory database management system (DBMS) that uses hybrid column-based storage, according to some embodiments.

FIG. 1 illustrates an in-memory database management system (DBMS) 100 that uses hybrid column-based storage, according to some embodiments. DBMS 100 includes a query engine 102, persistence layer 104, and database 106.

Query engine 102 can parse, optimize, and execute a query (e.g., Structured Query Language (SQL) query). For example, query engine 102 can execute a query that scans a column of a database table.

Query engine 102 can interact with persistence layer 104. Persistence layer 104 can map database objects such as, but not limited to, database tables, rows, and columns to their underlying representation in database 106.

Database 106 can store database objects in main memory 108 or secondary storage 110. Secondary storage 110 can also be referred to as secondary memory. Database 106 can store database tables column by column in main memory 108 or secondary storage 110. This can be referred to as column-based storage. Database 106 can store various other types of database objects in various other ways as would be appreciated by a person of ordinary skill in the art.

Figure 2:
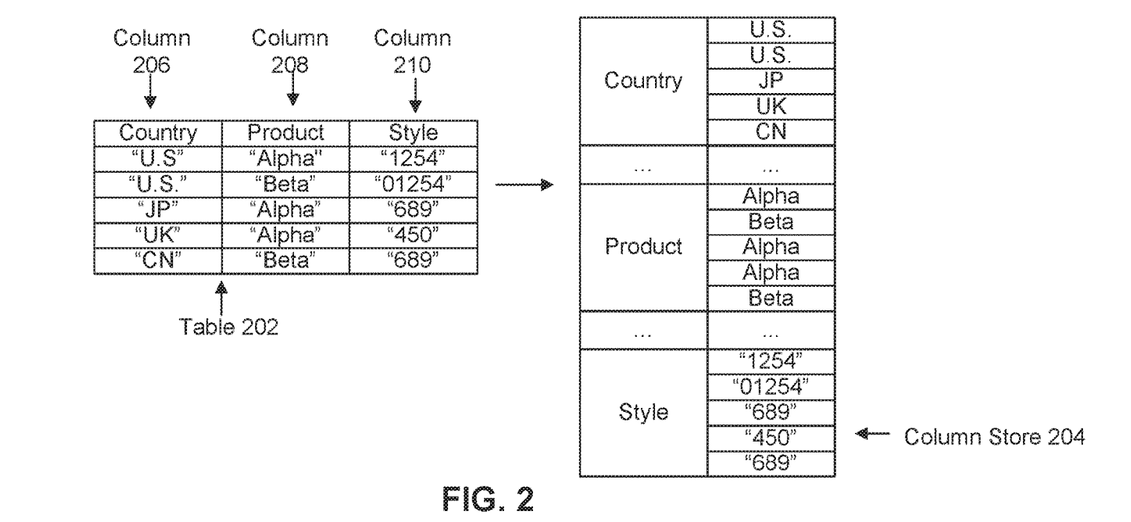
FIG. 2 illustrates an example of the DBMS of FIG. 1 using column-based storage, according to some embodiments.

FIG. 2 illustrates an example of DBMS 100 using column-based storage, according to some embodiments. FIG. 2 is discussed with reference to FIG. 1.

FIG. 2 includes table 202. Table 202 includes columns 206, 208, and 210. Table 202 is represented using column-based storage as column store 204.

DBMS 100 stores the columns of table 202 in contiguous storage locations in main memory 108 or secondary storage 110. For example, the "Country" column 206 is stored first as "U.S.", "U.S.", "JP", "UK", and "CN". The "Product" column 208 is stored second as "Alpha", "Beta", "Alpha", "Alpha", and "Beta". The "Style" column 210 is stored third as "1254", "01254", "689", "450", and "689".

DBMS 100 is designed to hold most of its data in main memory 108. This can decrease query response times. But it is often impossible for DBMS 100 to keep most of its data in main memory 108. This is often case when performing a column scan during query execution. In this case, DBMS 100 may be unable to load the entire column into main memory 108.

DBMS 100 can reduce such memory pressure in at least two ways. First, DBMS can use data compression. For example, DBMS 100 can compress a column using domain coding. Second, DBMS 100 can use a hybrid column store.

First, DBMS 100 can compress a column using domain coding. In domain coding, each column is split into a dictionary and a data vector. The dictionary can contain a list of distinct, sorted column values. Each column value can be assigned a value identifier (ID) that corresponds to the position of the column value in the dictionary. The data vector can be an integer array created from the original column by substituting each column value with its corresponding value ID.

Domain coding can achieve significant space savings. For example, domain coding can achieve significant space savings in DBMS 100 where the majority of the columns contain only a few distinct values. For example, a column may contain repeated person names, city names, product numbers, product prices, etc. These repeated values can be replaced by value IDs, one per column value. The size of the value ID can be just big enough to account for all the unique values, and may be much smaller than the size of the original column value. This can result in significant space savings for the column.

Figure 3:
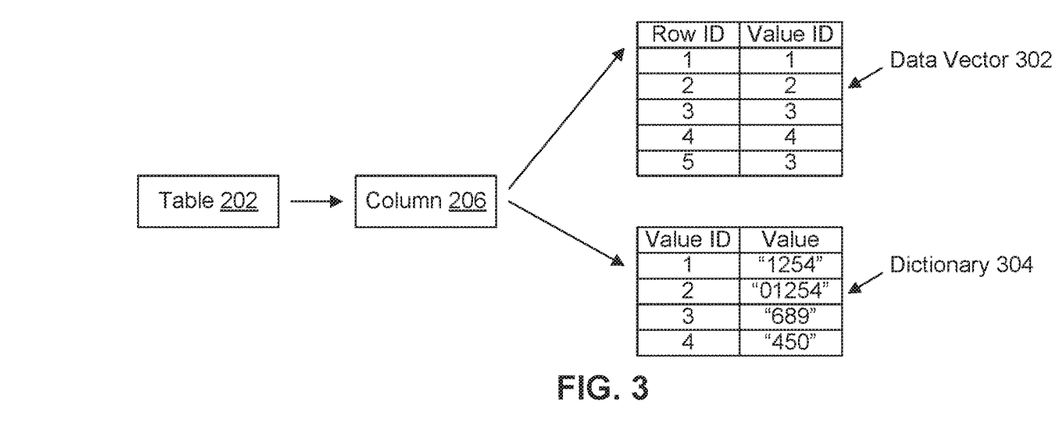
FIG. 3 illustrates an example of using domain coding to compress a column of a database table in FIG. 2, according to some embodiments.

FIG. 3 illustrates an example of using domain coding to compress "Style" column 206 of table 202, according to some embodiments. FIG. 3 discussed with respect to FIG. 2.

In FIG. 3, "Style" column 210 is represented by data vector 302 and dictionary 304. Data vector 302 can contain (row ID, value ID) pairs. A row ID in data vector 302 can identify a row in "Style" column 210. A value ID in data vector 302 can be used to determine the column value in a row in "Style" column 210.

Dictionary 304 can contain (value ID, value) pairs. A value ID in dictionary 304 can map a row ID of data vector 302 to the value in the associated row in "Style" column 210.

Domain coding can achieve significant data compression of a column by representing repeated values in the column using a single value ID. For example, instead of storing "689" directly in rows 3 and 5 of "Style" column 210, the value ID 3 can be stored in data vector 302 for rows 3 and 5. The actual value of "689" can then be looked up in dictionary 304. In other words, the value ID 3 is used to index into dictionary 304. Thus, instead storing "689" twice, a single digit value ID of 3 is stored twice.

Second, DBMS 100 can use a hybrid column store to reduce memory pressure. A hybrid column store can support both column and page loadability for individual columns. DBMS 100 can allow a user to specify which load mode to use for individual columns.

Column loadability is often used for frequently used data (also referred to as hot data). In column loadability, DBMS 100 can either fully load or unload all substructures of a column (e.g., dictionary, data vector, etc.) into main memory 108 at a given time. However, it is often undesirable to use column loadability when executing a query that causes a scan of a very large column. This is because column loadability can cause the column scan to block for a significant amount of time while waiting for the data vector to fully load into main memory 108.

Page loadability is often used for rarely accessed data (also referred to as cold data). In page loadability, DBMS 100 can load individual substructures of a column page-wise into main memory 108. As would be appreciated by a person of ordinary skill in the art, a page can be fixed-length contiguous block (e.g., 16 kilobytes) of virtual memory. Moreover, as would be appreciated by a person of ordinary skill in the art, a page can be evicted from main memory 108 by the host operating system at any time according to various strategies including, but not limited to, a least recently used (LRU) strategy.

Page loadability can increase database capacity in big data scenarios with data aging. Page loadability can also improve system elasticity in resource constrained use cases. Finally, page loadability can be useful when executing a query that causes a scan of a column.

Columns scans are often some of the most input/output (I/O) and central processing unit (CPU) intensive operations performed during query execution. The following is an example query that causes a column scan.

SELECT AVG(QUANTITY*EXTENDEDPRICE)
FROM LINEITEM WHERE SHIPDATA LIKE
"2017-%"

To answer this query, DBMS 100 can first evaluate which rows of column SHIPDATE satisfy the given LIKE predicate. This evaluation can require two steps.

First, DBMS 100 can translate the predicate to a set of value IDs using the dictionary associated with the SHIPDATE column. This step can be referred to as a dictionary scan.

Second, DBMS 100 can compare each value ID of the data vector of the SHIPDATE column against the value IDs found in the dictionary scan. This step can be referred to as a data vector scan.

The data vector scan is often more computationally expensive than the dictionary scan. This can be because DBMS 100 often advances row by row for the data vector scan. Moreover, the data vector is often much larger than the dictionary.

To reduce the data vector scan time, DBMS 100 can split the column scan range into N subranges. These N subranges can be processed in parallel by separate scan threads running on multiple CPUs. For example, DBMS 100 can split a column with 10,000 rows into four subranges: row 1-2,500, row 2,501-5,000, row 5,001-7,500, and row 7,501-10,000. These four subranges can be processed by four concurrent scan threads.

But splitting the scan range into N subranges can reduce query response time when using column loadability. This is because all the scan jobs may block until the data vector is fully loaded into main memory 108.

By contrast, with page loadability, each scan job can immediately start but may need to load pages as it proceeds. Each page load can block the corresponding scan job until the data is available. However, the scan job may block for only a short time because a page is often small size. Despite these benefits over column loadability, performing a column scan with page loadability can still incur potentially high I/O latencies. These I/O latencies can reduce query responsive time and throughput.

To reduce these I/O latencies, DBMS 100 can prefetch pages that are expected to be needed soon. For example, query engine 102 can issue asynchronous prefetch calls at certain points during query execution. A prefetch call can request the persistence layer 104 to load pages of the data vector into main memory 108.

But such prefetching is often unfair. This is because DBMS 100 may not prefetch approximately the same number of pages for each subrange of the column. DBMS 100 may also not prefetch pages in the same order that they are visited during the column scan. Such unfair prefetching can create unpredictable query response times, In addition, such unfair prefetching can reduce the amount of queries capable of being processed. This can be because scan threads that were favored may finish on average earlier than scan threads that were penalized (e.g., assuming equally large subranges).

Embodiments herein solve at least two technological problems. First, embodiments herein solve the technological problem of how to perform fair prefetching for a query. Second, embodiments herein solve the technological problem of how to increase the utilization of prefetch pages during query execution. Embodiments herein solve these technological problems by performing a first chance prefetch operation followed by a second chance prefetch operation.

In the first chance prefetch operation, DBMS 100 can prefetch a fixed number of pages for each subrange of a column being scanned. DBMS 100 can repeat the first chance prefetch operation for each subrange until all rows of the respective subrange have been prefetched or a prefetch limit is reached. In the second chance prefetch operation, DBMS 100 can prefetch any remaining pages in each subrange that were not prefetched in the first chance prefetch operation.

The first chance prefetch operation can solve the technological problem of how to fairly prefetch. This is because the first chance prefetch operation can prefetch approximately the same number of pages for each subrange of the column. Moreover, this is because the first chance prefetch operation can prefetch pages in the same order that they are visited during the column scan.

Second, the second chance prefetch operation can solve the technological problem of how to increase the utilization of prefetch pages during query execution. This is because the second chance prefetch operation can ensure that as many pages as possible are prefetched for a query. This can improve the chance that the query can be serviced by the prefetched pages.

In some embodiments, DBMS 100 can perform a first chance prefetch operation followed by a second chance prefetch operation. Both operations are discussed in turn with respect to FIG. 1. Both operations can be asynchronous (e.g., non-blocking). Moreover, both operations can work on a best-effort basis. This is because prefetched pages may be discarded from main memory 108 at any time.

The goal of the first chance prefetch operation can be to make as many pages of each subrange of a column available to the subsequent, parallel scan of the subranges (e.g., the scan of the data vector). The first chance prefetch operation can be invoked as early as possible during query execution. For example, the first chance prefetch operation can be invoked before the dictionary scan starts (e.g., as part of the predicate evaluation). The first chance prefetch operation can be invoked from a dedicated prefetch operator that is part of the physical query execution plan. As would be appreciated by a person of ordinary skill in the art, the first chance prefetch operation can be invoked at various other times and via various other mechanisms.

The first chance prefetch operation can involve two steps. In the first step, the first chance prefetch operation can create a prefetch context object for the column being scanned. The first chance prefetch operation can create a single prefetch context object for each column being scanned. A prefetch context object can be shared by all concurrent jobs (e.g., threads) scanning the column.

In some embodiments, to create the prefetch context object, query engine 102 can operate directly on the data vector of the column. For example, query engine 102 can interact with a MainDataVectorScanReader object that works directly on the data vector of the column.

The prefetch context object can contain a list of prefetch row range context objects. Each prefetch row range context object can correspond to a subrange of the data vector.

Each prefetch row range context object can maintain various information about its respective subrange. The prefetch row range context object can include a start row and an end row. The first chance prefetch operation can initialize the start row and end row of each prefetch row range context object to the start row and end row of its respective subrange.

The prefetch row range context object can include a page list. The page list can contain a list of pages. For example, the list of pages can be list of logical page numbers. The list of pages can represent a set of pages scheduled for prefetching during a scan of the associated subrange.

The prefetch row range context object can include a current row (also referred to as a watermark row). The current row can denote the last row on the last page that has been scheduled for prefetching. The first chance prefetch operation can initialize the current row to the start row.

In the second step, after initializing the prefetch context object, the first chance prefetch operation can collect pages for each subrange. The first chance prefetch operation can first calculate a number of rows to advance for each subrange when loading a fixed number of pages (e.g., P pages). For example, in some embodiments, the data vector can ask persistence layer 104 how many rows it can advance (e.g., N rows) starting at a current row for a subrange when loading a fixed number of pages (e.g., P pages).

After calculating the number of rows to advance for a subrange, the first chance prefetch operation can calculate a row range for the subrange. The row range can start at the current row in the subrange and extend the calculated number of rows to advance. The first chance prefetch operation can then translate the row range to a list of pages (e.g., page numbers) representing the rows in the row range. For example, in some embodiments, the data vector can request persistence layer 104 to translate the row range to a list of page numbers. The first chance prefetch operation can store the list of pages in the respective prefetch row range context object for the subrange. The list of pages can be in the same order that the row range is processed by a scan job (e.g., thread).

The first chance prefetch operation can then advance (or increment) the current row in the respective prefetch row range context object by the calculated number of rows to advance. For example, the data vector can advance the current row in the respective prefetch row range context object by the number of rows returned by persistence layer 104.

The first chance prefetch operation can also prefetch (or schedule for prefetch) the stored list of pages into main memory 108 for consumption by the respective scan job (e.g., thread). The first chance prefetch operation can then clear the list of pages in the respective prefetch row range context object.

DBMS 100 can repeat the first chance prefetch operation on each subrange until all rows of the respective subrange have been prefetched or a prefetch limit is reached. For example, DBMS 100 can repeat the first chance prefetch operation on a subrange until the current row in the respective prefetch row range context object exceeds the end row of the subrange.

The first chance prefetch operation can ensure fair prefetching. This is because the first chance prefetch operation can prefetch approximately the same number of pages for each subrange of the column. Moreover, this is because the first chance prefetch operation can prefetch pages in the same order that they are visited during the column scan. This fair prefetching can provide more consistent query response times and increase the amount of queries capable of being processed.

Figure 4:
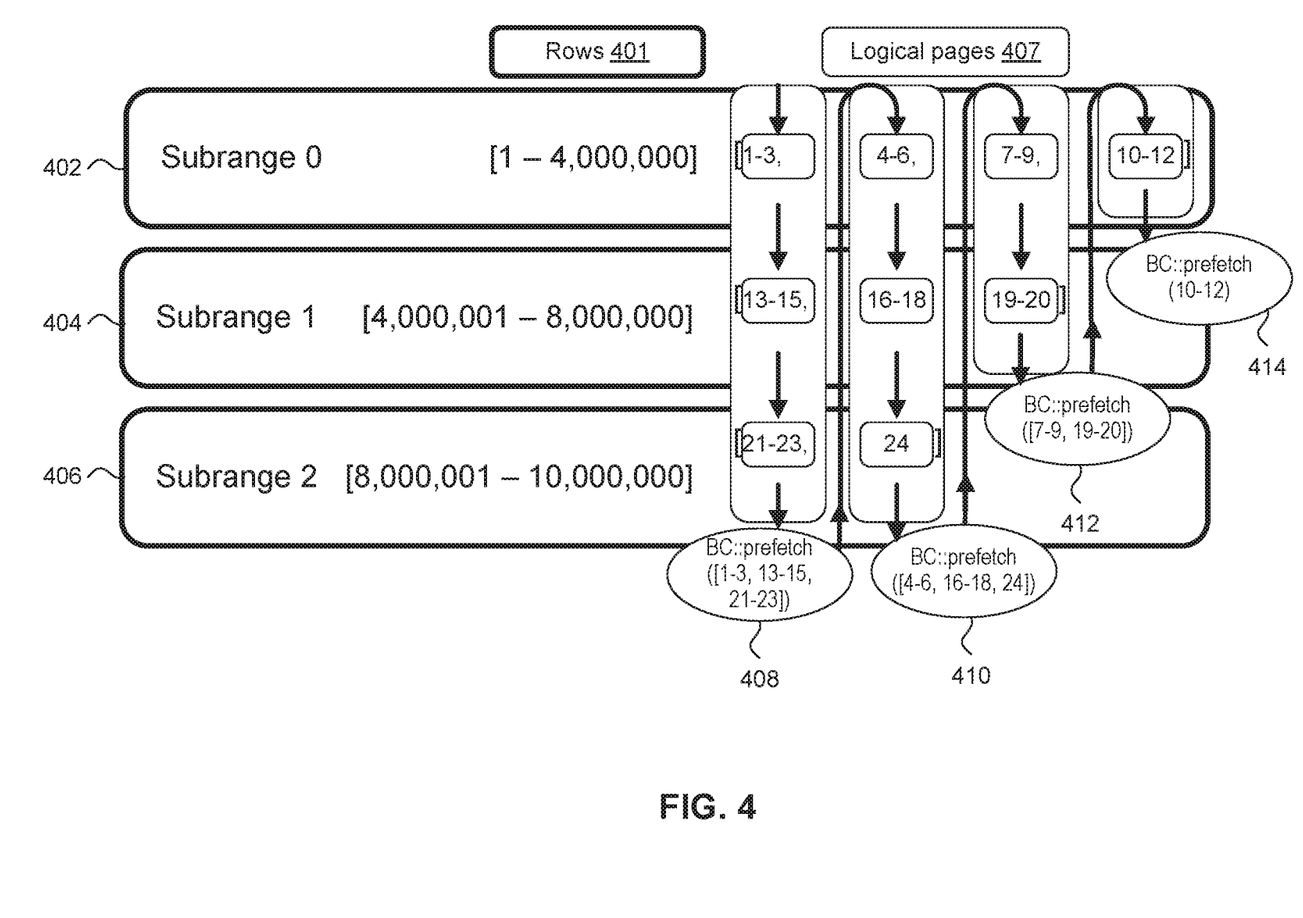
FIG. 4 illustrates an example of performing a first chance prefetch operation on three subranges, according to some embodiments.

FIG. 4 illustrates an example of performing the first chance prefetch operation on three subranges, according to some embodiments. FIG. 4 is discussed with respect to FIG. 1.

In FIG. 4, rows 401 of a data vector are being scanned. Rows 401 represent rows 1 to 10,000,000 of the data vector. To perform the first chance prefetch operation, DBMS 100 splits the data vector into three subranges 402, 404, and 406. Subrange 402 represents rows 1 to 4,000,000. Subrange 404 represents rows 4,000,001 to 8,000,000. Subrange 406 represents rows 8,000,001 to 10,000,000.

In FIG. 4, DBMS 100 performs the first chance prefetch operation with the constant number of pages 3. The first chance prefetch operation creates three prefetch row range context objects, one for each of subranges 402, 404, and 406. The first chance prefetch operation then collect pages for each subrange 402, 404, and 406. The first chance prefetch operation first calculate a number of rows to advance for each subrange when loading 3 pages. For example, first chance prefetch operation calculates a row advancement of 120,000 rows for subrange 402, a row advancement of 160,000 rows for subrange 404, and a row advancement of 75,000 rows for subrange 406.

After calculating the number of rows to advance for each subrange 402, 404, and 406, the first chance prefetch operation calculates a row range for each subrange. For example, the first chance prefetch operation calculates the row range for subrange 402 as rows 0 to 120,000. The first chance prefetch operation calculates the row range for subrange 404 as rows 4,000,001 to 4,160,001. And the first chance prefetch operation calculates the row range for subrange 406 as rows 8,000,001 to 8,075,001.

The first chance prefetch operation can then translate the row range for each subrange 402, 404, and 406 to a list of pages (e.g., page numbers) representing the rows in the row range. For example, the first chance prefetch operation translates rows 0 to 120,000 of subrange 402 to page numbers 1-3. The first chance prefetch operation translates rows 4,000,001 to 4,160,001 of subrange 404 to page numbers 13-15. And the first chance prefetch operation translates rows 8,000,001 to 8,075,001 of subrange 406 to page numbers 21-23. The list of pages numbers for each subrange can be in the same order that the corresponding row range is processed by the scan job (e.g. thread).

The first chance prefetch operation then stores the list of pages for each subrange 402, 404, and 406 in its respective prefetch row range context object. For example, the first chance prefetch operation stores page numbers 1-3 in the prefetch row range context object associated with subrange 402. The first chance prefetch operation stores page numbers 13-15 in the prefetch row range context object associated with subrange 404. And the first chance prefetch operation stores page numbers 21-23 in the prefetch row range context object associated with subrange 406.

The first chance prefetch operation then advances the current rows in the respective prefetch row range context objects by the respective calculated number of rows to advance. For example, the first chance prefetch operation advances the current row in the prefetch row range context object associated with subrange 402 to 120,001. The first chance prefetch operation advances the current row in the prefetch row range context object associated with subrange 404 to 4,160,001. And the first chance prefetch operation advances the current row in the prefetch row range context object associated with subrange 406 to 8,075,001.

The first chance prefetch operation also prefetches (or schedule for prefetch) the stored list of pages for each subrange 402, 404, and 406 into main memory 108 for consumption by the respective scan job (e.g., thread). For example, the first chance prefetch operation prefetches pages 408 representing page numbers 1-3, 13-15, and 21-23. DBMS 100 then repeats the first chance prefetch operation for each subrange 402, 404, and 406.

DBMS 100 repeats the first chance prefetch operation for each subrange 402, 404, and 406 until the current row of the respective subrange exceeds the end row of the respective subrange, or until a prefetch limit is satisfied. For example, the first chance prefetch operation prefetches pages 410 representing page numbers 4-6, 16-18, and 24 for subranges 402, 404, and 406, respectively, in the second iteration. The first chance prefetch operation then prefetches pages 412 representing page numbers 7-9 and 19-20 for subranges 402 and 404, respectively, in the third iteration. In the third iteration, first chance prefetch operation may not prefetch pages for subrange 406 because the prefetch limit is satisfied. Finally, the first chance prefetch operation prefetches pages 414 representing page numbers 10-12 for subrange 402 in the last iteration.

The first chance prefetch operation may not be able to prefetch all pages in each subrange. This can decrease performance. This is because a query may not be able to be serviced by prefetched pages. To solve this technological problem, DBMS 100 can perform a second chance prefetch operation after the first chance prefetch operation completes.

The second chance prefetch operation can be a best-effort attempt during the actual data vector scan to prefetch any remaining pages in each subrange that were not prefetched in the first chance prefetch operation. This can ensure that as many pages as possible are prefetched for the query. This can improve the chance that the query can be serviced by a prefetched page.

The second chance prefetch operation can utilize the same prefetch context object used by the first chance prefetch operation. The second chance prefetch operation can involve two steps. First, the second chance prefetch operation can determine which subranges have rows remaining to be prefetched as pages. For example, to make this determination, the second chance prefetch operation can determine whether the current row of a prefetch row range context object associated with a subrange exceeds the end row of the subrange. If so, the second chance prefetch operation can skip second chance prefetching for the subrange. If not, the second chance prefetch operation can perform second chance prefetching for the subrange.

To perform the second chance prefetching for the subrange, the second chance prefetch operation can calculate a row range for the subrange. The row range can start at the current row in the subrange and extend to the end row. The second chance prefetch operation can then translate the row range to a list of pages (e.g., page numbers) representing the rows in the row range. For example, in some embodiments, the data vector can request persistence layer 104 to translate the row range to a list of page numbers. The second chance prefetch operation can store the list of pages in the respective prefetch row range context object for the subrange. The list of pages can be in the same order that the row range is processed by a scan job (e.g., thread). The second chance prefetch operation can then attempt to prefetch (or schedule for prefetch) the stored list of pages into main memory 108 for consumption by the respective scan job (e.g., thread). In other words, the second chance prefetch operation can attempt to prefetch all remaining pages of the subrange.

The second chance prefetch operation's eager approach of attempting to prefetch all remaining pages of a subrange can give the best chance for the pages to present in main memory 108 before they are accessed. The second chance prefetch operation can be attempted on each subrange having remaining pages at the beginning of every scan job before the scan job starts processing its designated portion the subrange.

Figure 5:
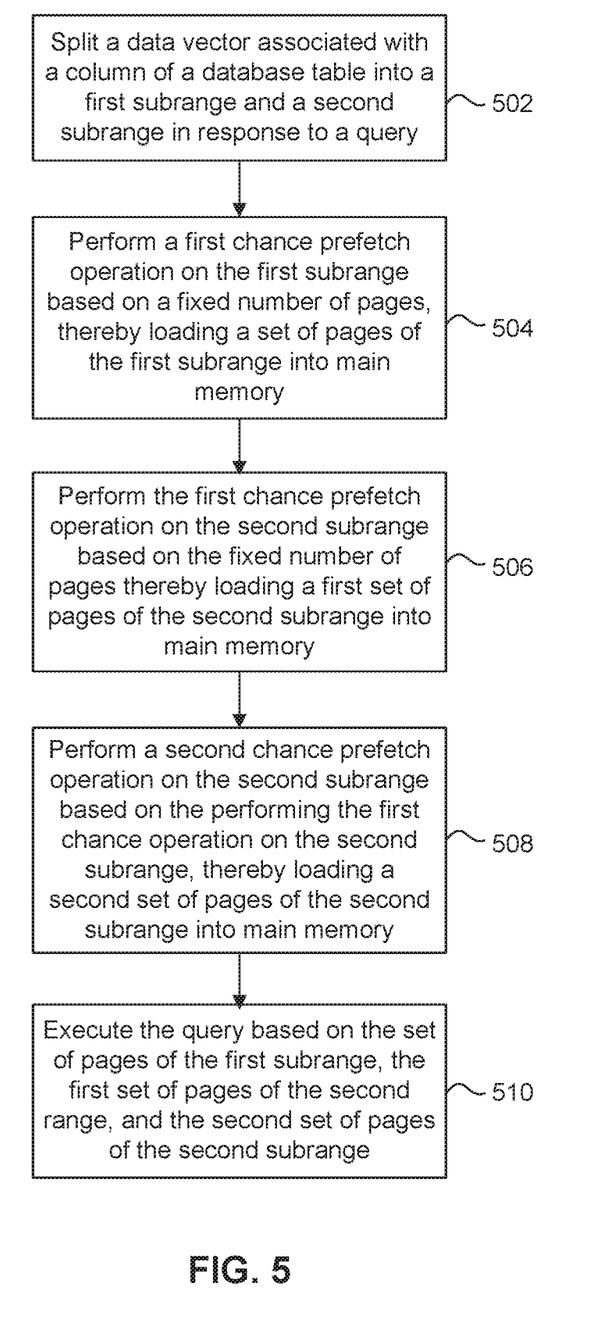
FIG. 5 is a flowchart illustrating a process for performing fair prefetching for a query, according to some embodiments.

FIG. 5 is a flowchart for a method 500 for performing fair prefetching for a query, according to some embodiments. Method 500 can be performed by processing logic that can comprise hardware (e.g., circuitry, dedicated logic, programmable logic, microcode, etc.), software (e.g., instructions run on a processing device), or a combination thereof. Method 500 is described with reference to FIG. 1.

In step 502, DBMS 100 splits a data vector associated with a column of a database table into a first subrange and a second subrange in response to a query.

In step 504, DBMS 100 performs a first chance prefetch operation on the first subrange based on a fixed number of pages thereby loading a set of pages of the first subrange into main memory (e.g., main memory 108). During the first chance prefetch operation on the first subrange, DBMS 100 can calculate a number of rows to advance for the first subrange based on the fixed number of pages and a current row associated with the first subrange. DBMS 100 can calculate the number of rows to advance for the first subrange using the data vector.

DBMS 100 can also determine a portion of pages of the set of pages of the first subrange based on the number of rows to advance for the first subrange and the current row associated with the first subrange. DBMS 100 can determine the portion of pages of the set of pages of the first subrange using persistence layer 104.

DBMS 100 can increment the current row associated with the first subrange based on the number of rows to advance for the first subrange. DBMS 100 can prefetch (or schedule to prefetch) the portion of pages of the set of pages of the first subrange into main memory 108. DBMS 100 can finally repeat the first chance prefetch operation on the first subrange until all rows of the first subrange have been prefetched or a prefetch limit is satisfied.

In step 506, DBMS 100 performs the first chance prefetch operation on the second subrange based on the fixed number of pages thereby loading a first set of pages of the second subrange into main memory (e.g., main memory 108). During the first chance prefetch operation on the second subrange, DBMS 100 can calculate a number of rows to advance for the second subrange based on the fixed number of pages and a current row associated with the second subrange. DBMS 100 can calculate the number of rows to advance for the second subrange using the data vector.

DBMS 100 can also determine a portion of pages of the set of pages of the second subrange based on the number of rows to advance for the second subrange and the current row associated with the second subrange. DBMS 100 can determine the portion of pages of the set of pages of the second subrange using persistence layer 104.

DBMS 100 can increment the current row associated with the second subrange based on the number of rows to advance for the second subrange. DBMS 100 can prefetch (or schedule to prefetch) the portion of pages of the set of pages of the second subrange into main memory (e.g., main memory 108). DBMS 100 can finally repeat the first chance prefetch operation on the second subrange until all rows of the second subrange have been prefetched or the prefetch limit is satisfied.

In step 508, DBMS 100 performs a second chance prefetch operation on the second subrange based on the performing the first chance prefetch on the second subrange, thereby loading a second set of pages of the second subrange into main memory 108. During the second chance prefetch operation on the second subrange, DBMS 100 can determine that a current row associated with the second subrange is before an end row of the second subrange. DBMS 100 can further determine the second set of pages of the second subrange based on the current row associated with the second subrange and the end row of the second subrange. DBMS 100 can prefetch (or schedule to prefetch) the second set of pages for the second subrange into main memory (e.g., main memory 108).

In step 510, DBMS 100 executes the query based on the set of pages of the first subrange, the first set of pages of the second subrange, and the second set of pages of the second subrange.

Figure 6:
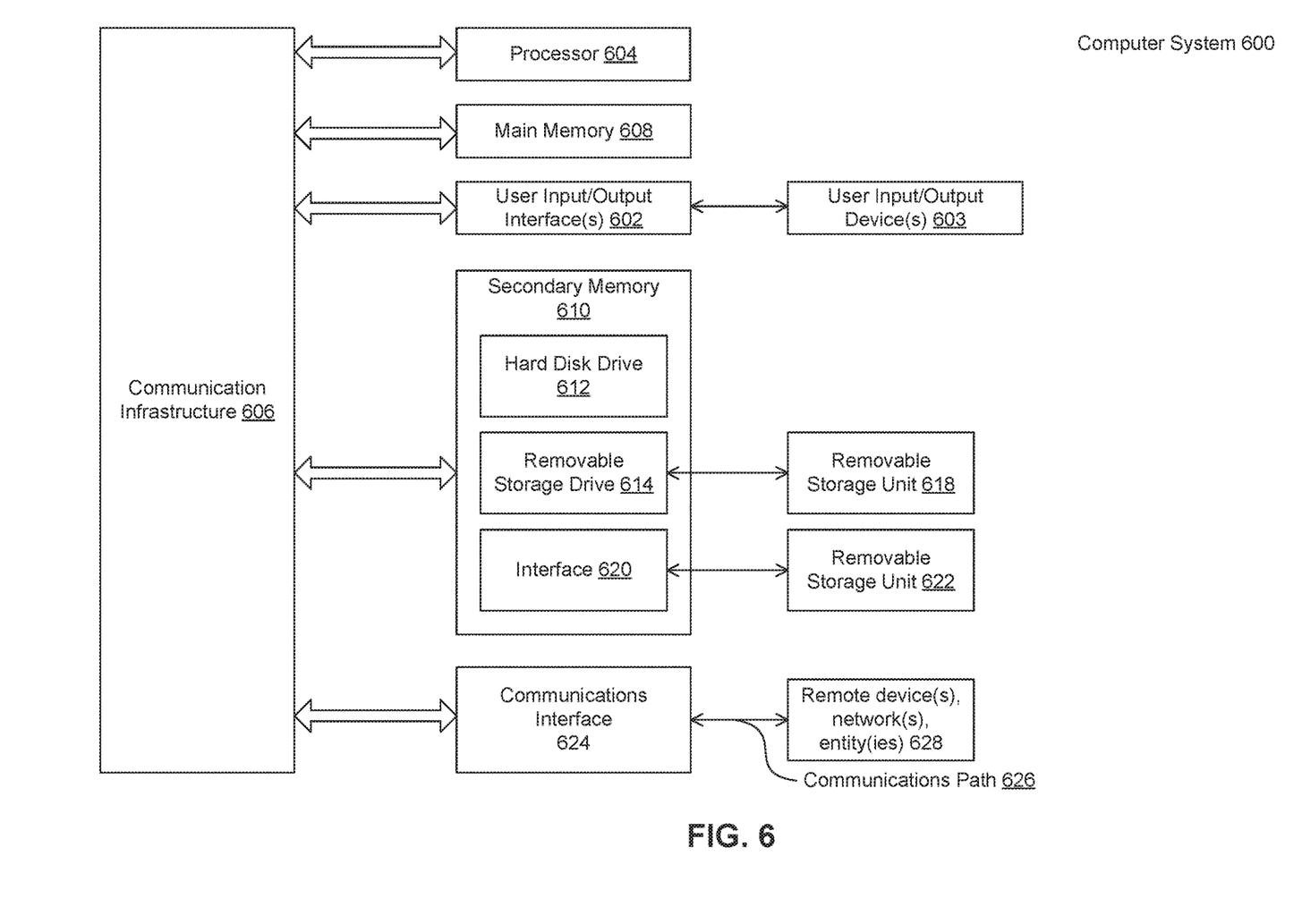
FIG. 6 is an example computer system useful for implementing various embodiments.

Various embodiments can be implemented, for example, using one or more well-known computer systems, such as computer system 600 shown in FIG. 6. For example, computer system 600 can perform method 500. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for prefetching for a query, comprising:
    splitting, by at least one processor, a data vector associated with a column of a database table into a first subrange and a second subrange in response to the query;
    performing, by the at least one processor, a first chance prefetch operation on the first subrange based on a first number of rows to prefetch for the first subrange, wherein the first number of rows to prefetch for the first subrange is calculated based on a fixed number of pages, and wherein the performing the first chance prefetch operation on the first subrange loads a first set of pages of the first subrange into a main memory;
    performing, by the at least one processor, the first chance prefetch operation on the second subrange based on a second number of rows to prefetch for the second subrange, wherein the second number of rows to prefetch for the second subrange is calculated based on the fixed number of pages, and wherein the performing the first chance prefetch operation on the second subrange loads a second set of pages of the second subrange into the main memory;
    performing, by the at least one processor, a second chance prefetch operation on the second subrange based on the performing the first chance prefetch operation on the second subrange, thereby loading a third set of pages of the second subrange into the main memory; and
    executing, by the at least one processor, the query based on the first set of pages of the first subrange, the second set of pages of the second subrange, and the third set of pages of the second subrange.

2. The method of claim 1, further comprising:
    determining, by the at least one processor, all rows of the first subrange have been prefetched into the main memory; and
    skipping, by the at least one processor, performing the second chance prefetch operation on the first subrange based on the determination that all the rows of the first subrange have been prefetched into the main memory.

3. The method of claim 1, wherein the performing the second chance prefetch operation on the second subrange further comprises:
    determining, by the at least one processor, a current row associated with the second subrange is before an end row of the second subrange;
    determining, by the least one processor, the third set of pages of the second subrange based on the current row associated with the second subrange and the end row of the second subrange; and prefetching, by the at least one processor, the third set of pages for the second subrange into the main memory.

4. The method of claim 1, wherein the performing the first chance prefetch operation on the first subrange further comprises:
determining, by the at least one processor, the first set of pages of the first subrange based on the number of rows to prefetch for the first subrange and a current row associated with the first subrange;
incrementing, by the at least one processor, the current row associated with the first subrange based on the number of rows to prefetch for the first subrange; and
prefetching, by the at least one processor, the first set of pages of the first subrange into the main memory; and
further comprising repeating, by the at least one processor, the first chance prefetch operation until all rows of the first subrange have been prefetched or a prefetch limit is satisfied.

5. The method of claim 4, wherein the first set of pages of the first subrange comprises a set of rows in the first subrange, wherein the set of rows begins at the current row, and a size of the set of rows is equal to the number of rows to prefetch for the first subrange.

6. The method of claim 4, wherein the determining the first set of pages of the first subrange comprises:
determining, by the at least one processor, the first set of pages of the first subrange using a persistence layer.

7. The method of claim 1, wherein the first number of rows to prefetch for the first subrange is calculated using the data vector.

8. A system, comprising:
a memory; and
at least one processor coupled to the memory and configured to:
split a data vector associated with a column of a database table into a first subrange and a second subrange in response to a query;
perform a first chance prefetch operation on the first subrange based on a first number of rows to prefetch for the first subrange, wherein the first number of rows to prefetch for the first subrange is calculated based on a fixed number of pages, and wherein the performing the first chance prefetch operation on the first subrange loads a first set of pages of the first subrange into the memory;
perform the first chance prefetch operation on the second subrange based on a second number of rows to prefetch for the second subrange, wherein the second number of rows to prefetch for the second subrange is calculated based on the fixed number of pages, and wherein the performing the first chance prefetch operation on the second subrange loads a second set of pages of the second subrange into the memory;
perform a second chance prefetch operation on the second subrange based on the performing the first chance prefetch operation on the second subrange, thereby loading a second set of pages of the third subrange into the memory; and
execute the query based on the first set of pages of the first subrange, the second set of pages of the second subrange, and the third set of pages of the second subrange.

9. The system of claim 8, the at least one processor further configured to:
determine all rows of the first subrange have been prefetched into the memory; and
skip performing the second chance prefetch operation on the first subrange based on the determination that all the rows of the first subrange have been prefetched into the memory.

10. The system of claim 8, wherein to perform the second chance prefetch operation on the second subrange the at least one processor is further configured to:
determine a current row associated with the second subrange is before an end row of the second subrange;
determine the second set of pages of the third subrange based on the current row associated with the second subrange and the end row of the second subrange; and
prefetch the second set of pages for the third subrange into the memory.

11. The system of claim 8, wherein to perform the first chance prefetch operation on the first subrange the at least one processor is further configured to:
determine the first set of pages of the first subrange based on the number of rows to prefetch for the first subrange and a current row associated with the first subrange;
increment the current row associated with the first subrange based on the number of rows to prefetch for the first subrange; and
prefetch the first set of pages of the first subrange into the memory;
wherein the at least one processor is further configured to repeat the first chance prefetch operation until all rows of the first subrange have been prefetched or a prefetch limit is satisfied.

12. The system of claim 11, wherein the first set of pages of the first subrange comprises a set of rows in the first subrange, wherein the set of rows begins at the current row, and a size of the set of rows is equal to the number of rows to prefetch for the first subrange.

13. The system of claim 11, wherein to determine the first set of pages of the first subrange the at least one processor is further configured to:
determine the first set of pages of the first subrange using a persistence layer.

14. The system of claim 8, wherein the first number of rows to prefetch for the first subrange is calculated using the data vector.

15. A non-transitory computer-readable medium having instructions stored thereon that, when executed by at least one computing device, cause the at least one computing device to perform operations comprising:
splitting a data vector associated with a column of a database table into a first subrange and a second subrange in response to a query;
performing a first chance prefetch operation on the first subrange based on a first number of rows to prefetch for the first subrange, wherein the first number of rows to prefetch for the first subrange is calculated based on a fixed number of pages, and wherein the performing the first chance prefetch operation on the first subrange loads a first set of pages of the first subrange into a main memory;
performing the first chance prefetch operation on the second subrange based on a second number of rows to prefetch for the second subrange, wherein the second number of rows to prefetch for the second subrange is calculated based on the fixed number of pages, and wherein the performing the first chance prefetch operation on the second subrange loads a a second set of pages of the second subrange into the main memory;
performing a second chance prefetch operation on the second subrange based on the performing the first chance prefetch operation on the second subrange, thereby loading a second set of pages of the third subrange into the main memory; and executing the query based on the first set of pages of the first subrange, the second set of pages of the second subrange, and the third set of pages of the second subrange.

16. The non-transitory computer-readable medium of claim 15, the operations further comprising:

determining all rows of the first subrange have been prefetched into the main memory; and skipping performing the second chance prefetch operation on the first subrange based on the determination that all the rows of the first subrange have been prefetched into the main memory.

17. The non-transitory computer-readable medium of claim 15, the performing the second chance prefetch operation on the second subrange further comprising:

determining a current row associated with the second subrange is before an end row of the second subrange;

determining the third set of pages of the second subrange based on the current row associated with the second subrange and the end row of the second subrange; and prefetching the third set of pages for the second subrange into the main memory.

18. The non-transitory computer-readable medium of claim 15, the performing the first chance prefetch operation on the first subrange further comprising:

determining the first set of pages of the first subrange based on the number of rows to prefetch for the first subrange and a current row associated with the first subrange;

incrementing the current row associated with the first subrange based on the number of rows to prefetch for the first subrange; and prefetching the first set of pages of the first subrange into the main memory; and the operations further comprising repeating the first chance prefetch operation until all rows of the first subrange have been prefetched or a prefetch limit is satisfied.

19. The non-transitory computer-readable medium of claim 18, wherein the first set of pages of the first subrange comprises a set of rows in the first subrange, wherein the set of rows begins at the current row, and a size of the set of rows is equal to the number of rows to prefetch for the first subrange.

20. The non-transitory computer-readable medium of claim 18, wherein the first number of rows to prefetch for the first subrange is calculated using the data vector.

* * * * *